United States Patent
Huang et al.

(10) Patent No.: US 9,356,717 B1
(45) Date of Patent: May 31, 2016

(54) DEVICE AND METHOD OF SELECTING A CHANNEL

(71) Applicant: Beken Corporation, Shanghai (CN)

(72) Inventors: Yiming Huang, Shanghai (CN); Weifeng Wang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 0 days.

(21) Appl. No.: 14/664,915

(22) Filed: Mar. 23, 2015

(30) Foreign Application Priority Data

Mar. 5, 2015 (CN) .......................... 2015 1 0098421

(51) Int. Cl.
| | |
|---|---|
| *H04B 1/18* | (2006.01) |
| *H04H 40/36* | (2008.01) |
| *H04B 1/16* | (2006.01) |
| *H04B 1/00* | (2006.01) |

(52) U.S. Cl.
CPC ............. *H04H 40/36* (2013.01); *H04B 1/0003* (2013.01); *H04B 1/1653* (2013.01)

(58) Field of Classification Search
CPC .. H04B 1/48; H04B 2001/1072; H04B 1/086; H03F 2200/451; H03J 1/0008; H03J 7/04; H03J 1/06; H03J 2200/11; H03J 3/20; H03J 5/0281; H03J 5/029; H03J 7/285; H04W 24/10; H04W 48/16; H04W 88/06; H04W 88/10; H04W 8/22; H04W 8/24
USPC ..................... 455/151.1–160.1, 166.1–166.2, 455/188.1–188.2; 342/93
See application file for complete search history.

(56) References Cited

U.S. PATENT DOCUMENTS

| | | | | |
|---|---|---|---|---|
| 7,499,694 | B1* | 3/2009 | Yeo ....................... | H03J 1/0033 455/230 |
| 8,942,644 | B2* | 1/2015 | Schell ................. | H04B 1/0064 361/13 |
| 2012/0001790 | A1* | 1/2012 | Edwards ................ | G01S 7/415 342/93 |
| 2013/0337754 | A1* | 12/2013 | Khlat ....................... | H01P 1/15 455/78 |
| 2014/0227982 | A1* | 8/2014 | Granger-Jones ..... | H04B 7/0404 455/77 |

OTHER PUBLICATIONS

Designing Wheel-Tuned, Digital-Display Radios with Next-Generation Radio ICs http://www.silabs.com/Support%20Documents/TechnicalDocs/ATDD-Radio-White-Paper.pdf, 2011.

* cited by examiner

*Primary Examiner* — Edward Urban
*Assistant Examiner* — Max Mathew
(74) *Attorney, Agent, or Firm* — Perkins Coie LLP

(57) ABSTRACT

A device for selecting a channel comprises a speed detector configured to detect a speed of a channel selecting mechanism; a controller connected to the speed detector; and a frequency deviation detector connected to the controller and is configured to receive an input signal. The controller selects a wideband channel searching mode for the frequency deviation detector if the speed is higher than a speed threshold, or a narrowband channel searching mode if the speed is lower than the speed threshold. The frequency deviation detector detects an existence of a channel when either an actual frequency deviation of the input signal is lower than a first wideband frequency deviation threshold when the wideband channel searching mode is selected, or the actual frequency deviation is lower than a narrowband frequency deviation threshold when the narrowband channel searching mode is selected.

16 Claims, 13 Drawing Sheets

DEVICE AND METHOD OF SELECTING A CHANNEL

CROSS REFERENCE TO RELATED APPLICATION

This application claims priority to Chinese Application No. 201510098421.7 entitled "device and method of selecting a channel," filed on Mar. 5, 2015 by Beken Corporation, which is incorporated herein by reference.

TECHNICAL FIELD

The present application relates to circuits, and more particularly but not exclusively to a device and a method of selecting a channel.

BACKGROUND

Conventional AM radio usually searches for a channel by detecting frequency deviation using Micro-programmed Control Units (MCU). However, the conventional channel searching device cannot match the speed of a channel searching mechanism, and a target channel can be easily missed. Therefore it is desirable to have an AM radio which can improve channel searching, and reduce missed channel.

SUMMARY

According to an embodiment of the invention, a device for selecting a channel, comprises a speed detector configured to detect a speed of a channel selecting mechanism; a controller connected to the speed detector; and a frequency deviation detector connected to the controller and is configured to receive an input signal, wherein the controller is configured to select a channel searching mode for the frequency deviation detector if the speed is higher than a speed threshold, or a narrowband channel searching mode if the speed is lower than the speed threshold; the frequency deviation detector is configured to detect an existence of a channel if an actual frequency deviation of the input signal is lower than a first wideband frequency deviation threshold when the wideband channel searching mode is selected, or detect the existence of a channel if the actual frequency deviation is lower than a narrowband frequency deviation threshold when the narrowband channel searching mode is selected.

According to another embodiment of the invention, a method of selecting a channel, comprises detecting a speed of a channel selecting mechanism; selecting a wideband channel searching mode for a frequency deviation detector if the speed is higher than a speed threshold, or a narrowband channel searching mode if the speed is lower than the speed threshold; detecting an existence of a channel if an actual frequency deviation of an input signal is lower than a first wideband frequency deviation threshold when the wideband channel searching mode is selected, or detecting an existence of a channel if the actual frequency deviation is lower than a narrowband frequency deviation threshold when the narrowband channel searching mode is selected.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Various aspects and examples of the invention will now be described. The following description provides specific details for a thorough understanding and enabling description of these examples. Those skilled in the art will understand, however, that the invention may be practiced without many of these details.

Additionally, some well-known structures or functions may not be shown or described in detail, so as to avoid unnecessarily obscuring the relevant description.

Figure 1:
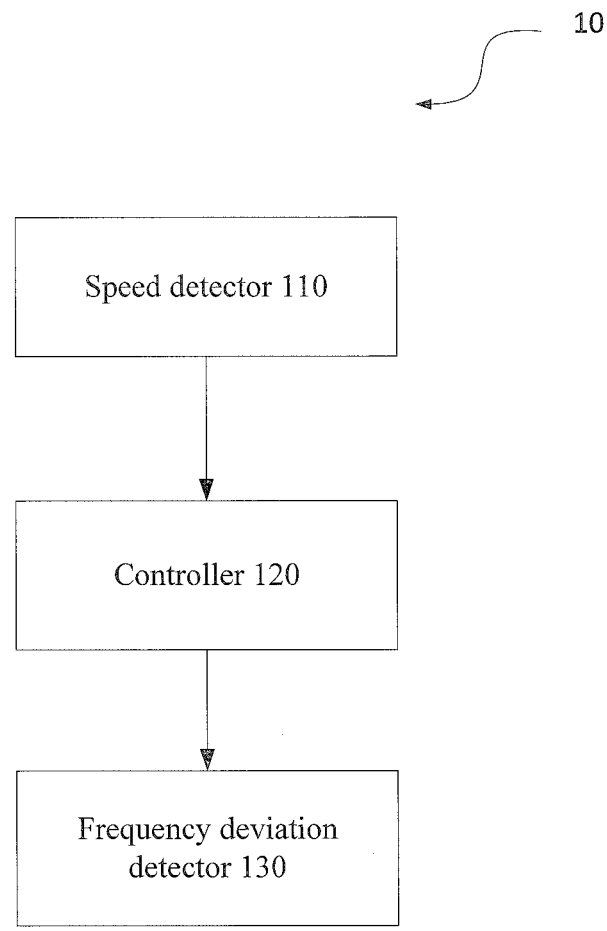
FIG. 1 is a block diagram illustrating an embodiment of a device for detecting a channel.

FIG. 1 is a block diagram illustrating an embodiment of a device for detecting a channel. The device 10 for selecting a channel comprises a speed detector 110, a controller 120 and a frequency deviation detector 130. The speed detector 110 is configured to detect a speed of a channel selecting mechanism, such as a wheel. Accordingly, a speed of the channel selecting wheel may comprise a rotation speed, for example. In an embodiment the device 10 for selecting a channel is located in an AM radio. The AM radio includes a channel selecting mechanism for the user to rotate and select channels. The speed of the channel selecting mechanism comprises a speed of a signal inputted by the user, for example, the speed that the user rotates the channel selecting mechanism. The controller 120 is connected to the speed detector 110. The frequency deviation detector 130 is connected to the controller 120 and is configured to receive an input signal. The controller 120 is configured to select a wideband channel searching mode for the frequency deviation detector 130 if the speed is higher than a speed threshold, or a narrowband channel searching mode if the speed is lower than the speed threshold. Note frequency deviation represents a frequency deviation between a current local oscillation frequency and a frequency (RF) of the AM input signal. The local oscillation frequency is generated by the radio. The controller may use different frequency deviation references respectively for the wideband channel searching mode and the narrowband channel searching as discussed below.

The frequency deviation detector 130 is configured to detect an existence of a channel if an actual frequency deviation of the input signal is lower than a first wideband frequency deviation threshold when the wideband channel searching mode is selected, or detect the existence of a channel if the actual frequency deviation is lower than a narrowband frequency deviation threshold when the narrowband channel searching mode is selected.

Note the AM input signal may correspond to a fixed AM channel. Rotating the channel selecting mechanism can be viewed as changing the local oscillation frequency of the radio, and the frequency deviation between the current local oscillation frequency and the frequency of the AM input signal changes accordingly. When the frequency deviation between the AM input signal and a frequency of local oscillator is lower than a threshold, it means that the AM input signal can be demodulated successfully, i.e., an existence of the channel can be detected.

Figure 2:
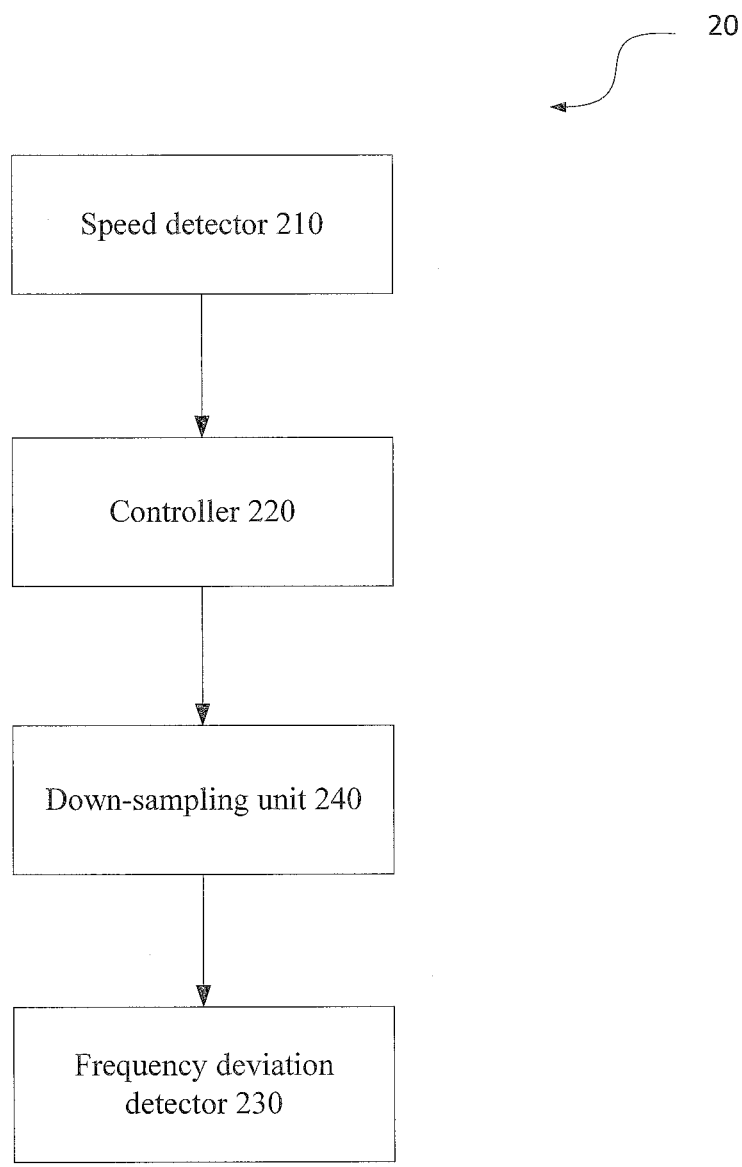
FIG. 2 is a block diagram illustrating another embodiment of a device for detecting a channel.

FIG. 2 is a block diagram illustrating another embodiment of a device for detecting a channel. Details are omitted for elements speed detector 210, the controller 220 and the frequency deviation detector 230 which are substantially similar to 110,120 and 130 discussed with reference with FIG. 1. In addition to the speed detector 210, the controller 220 and the frequency deviation detector 230, the device 20 for selecting a channel further comprises a down-sampling unit 240. The down-sampling unit 240 is coupled to both the controller 220 and the frequency deviation detector 230, and is configured to generate a downsampling signal by down-sampling the input signal. The frequency deviation detector 230 is configured to detect the existence of the channel if the actual frequency deviation of the downsampling signal is lower than a second wideband frequency deviation threshold when the wideband channel searching mode is selected, or detect the existence of the channel if the actual frequency deviation of the downsampling signal is lower than the narrowband frequency deviation threshold when the narrowband channel searching mode is selected.

Figure 3:
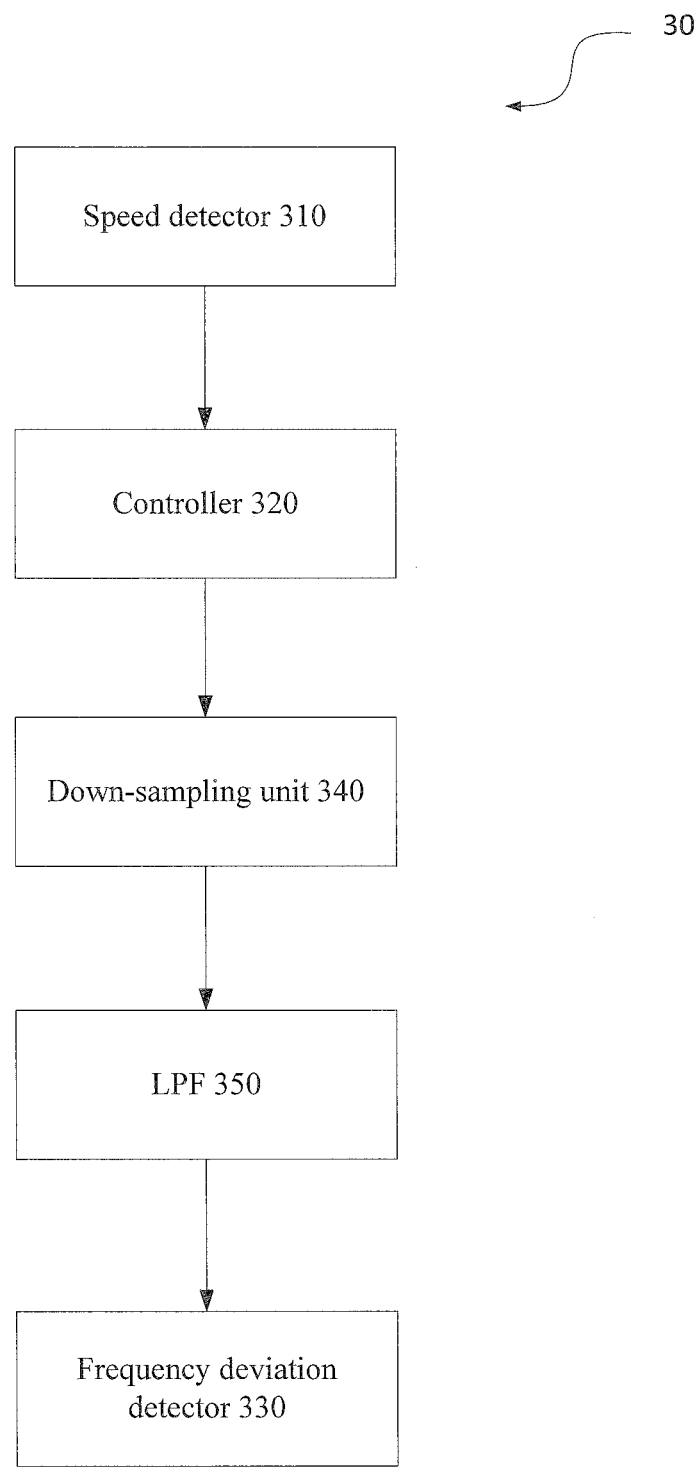
FIG. 3 is a block diagram illustrating another embodiment of a device for detecting a channel.

FIG. 3 is a block diagram illustrating another embodiment of a device for detecting a channel. Details are omitted for elements speed detector 310, the controller 320 and the frequency deviation detector 330 and the down-sampling unit 340 which are substantially similar to 110,120 and 130 or 240 already discussed with reference with FIGS. 1 and 2. In addition to the speed detector 310, the controller 320, the frequency deviation detector 330 and the down-sampling unit 340, the device 30 further comprises a low pass filter (LPF) 350. The low pass filter 350 is coupled to both the downsampling unit 340 and the frequency deviation detector 330, and the low pass filter 350 is configured to generate a filtered signal by filtering the downsampling signal. The frequency deviation detector 330 is further configured to detect the existence of the channel if the actual frequency deviation of the filtered input signal is lower than the narrowband frequency deviation threshold when the narrowband channel searching mode is selected.

Figure 4:
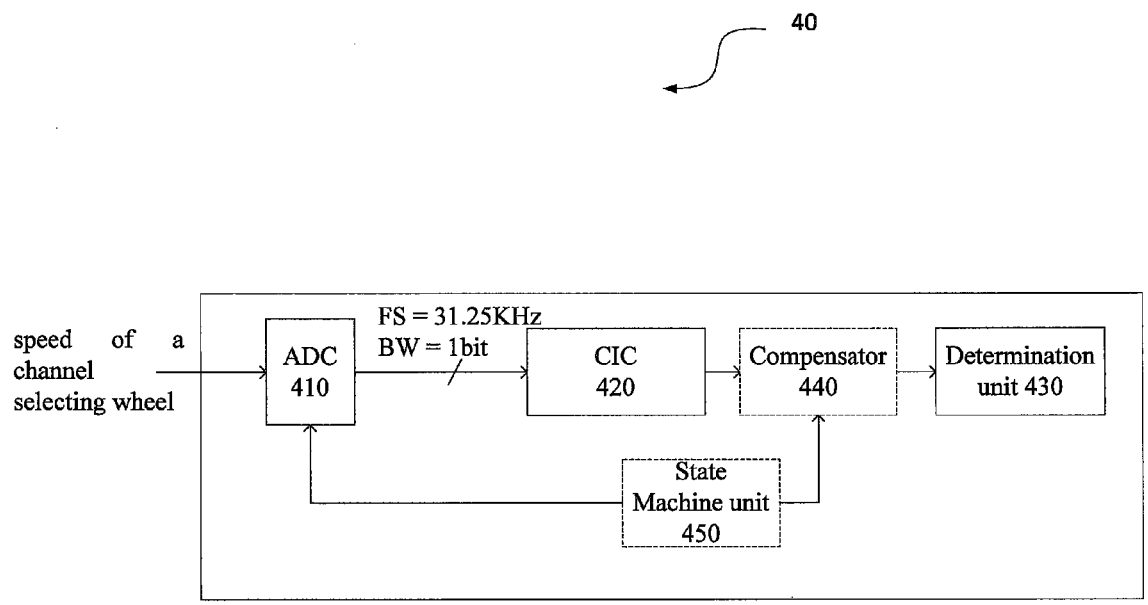
FIG. 4 is a block diagram illustrating an embodiment of a speed detector shown in any of FIG. 1, 2 or 3.

FIG. 4 is a block diagram illustrating an embodiment of a speed detector shown in any of FIG. 1, 2 or 3. The speed detector 40 comprises an analog-to-digital converter (ADC) 410, a cascaded integrator-comb (CIC) filter 420, and a determination unit 430. The analog-to-digital converter 410 is configured to generate unsigned numbers based on input voltage change. The unsigned numbers represent the speed of the channel selecting mechanism. The cascaded integrator-comb filter 420 is connected to the analog-to-digital converter 410 and is configured to generate downsampling signed number by performing non-return to zero (NRZ) operation on the unsigned numbers to generate signed number, and downsampling the signed number. The determination unit 430 is connected to the cascaded integrator-comb filter 420 and is configured to select the wideband frequency deviation threshold for the frequency deviation detector if a frequency difference between a first downsampling signed number and a second downsampling signed number is higher than a first threshold, or select the narrowband frequency deviation threshold for the frequency deviation detector if the frequency difference is lower than or equals the first threshold, wherein there is a fixed time discrepancy between the first downsampling signed number and the second downsampling signed number, and both the first downsampling signed number and the second downsampling signed number are stable. For example, the first downsampling signed number is 100 ms ahead of the second downsampling signed number. Note the first threshold represents the threshold for the frequency deviation change corresponding to the speed of the channel selecting mechanism, which is different from the first or second wideband frequency deviation threshold or narrowband frequency deviation threshold discussed above.

Alternatively, the determination unit 430 is configured to determine that the first downsampling signed number is stable if a maximize difference among the first downsampling signed number and its previous two downsampling signed numbers is smaller than a second threshold. The second threshold may be, for example, 2.

Alternatively, the device 40 further comprises a compensator 440 and a state machine unit 450. The state machine unit 450 is connected to both the analog-to-digital converter 410 and the compensator 440 and is configured to obtain a DC offset voltage of the analog-to-digital converter 410 by connecting the analog-to-digital converter 410 to ground. When the ADC is connected to ground, there is no external input signal, and the value outputted by the ADC represents offset of ADC itself. The compensator 440 is configured to compensate for the DC offset voltage. The compensator 440 may compensate the offset by subtracting the offset from the current value.

Alternatively, the state machine unit 450 is further configured to obtain a gain of the analog-to-digital converter 410 by connecting the analog-to-digital converter 410 to a power source (for example VDD) of the analog-to-digital converter after the DC offset voltage is compensated for; and the compensator 440 is configured to compensate for the gain. The compensator 440 may compensate the gain by dividing the current value by the gain.

Figure 5:
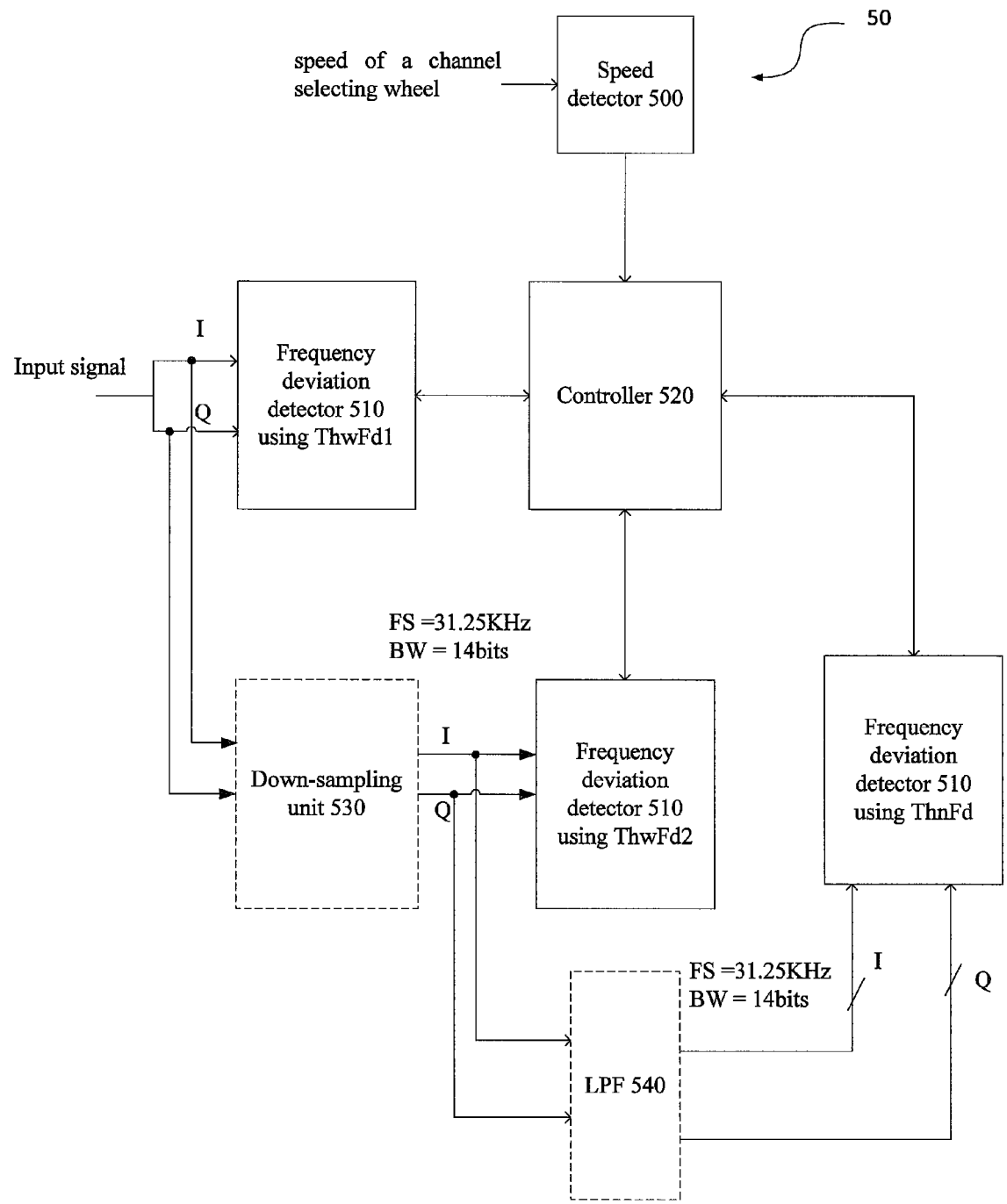
FIG. 5 is a diagram illustrating an embodiment of a device for detecting a channel.

FIG. 5 is a diagram illustrating an embodiment of a device for detecting a channel. As shown in FIG. 5, the device 50 comprises a speed detector 500, a frequency deviation detector 510, a controller 520, a down-sampling unit 520, and a low pass filter 540. The speed detector 500 detects a speed of a channel selecting mechanism. The controller 520 is connected to both the speed detector 500 and the frequency deviation detector 510 and instructs which threshold the frequency deviation detector 510 may use according to the speed detected by the speed detector 500. The input signal, for example, AM input signal is divided into two branches, i.e., In-phase (I) and Quadrature (Q) branches. The I and Q branches are inputted to the frequency deviation detector 510 using a first wideband frequency deviation threshold ThwFD1. Alternatively, the I and Q branches are inputted to the frequency deviation detector 510 using a second wideband frequency deviation threshold ThwFD2 after the I and Q branches are treated by the down-sampling unit 530. Alternatively, the I and Q branches are inputted to the frequency deviation detector 510 using a narrowband frequency deviation threshold ThnFD after the I and Q branches are treated by both the down-sampling unit 530 and the low pass filter 540.

Figure 6:
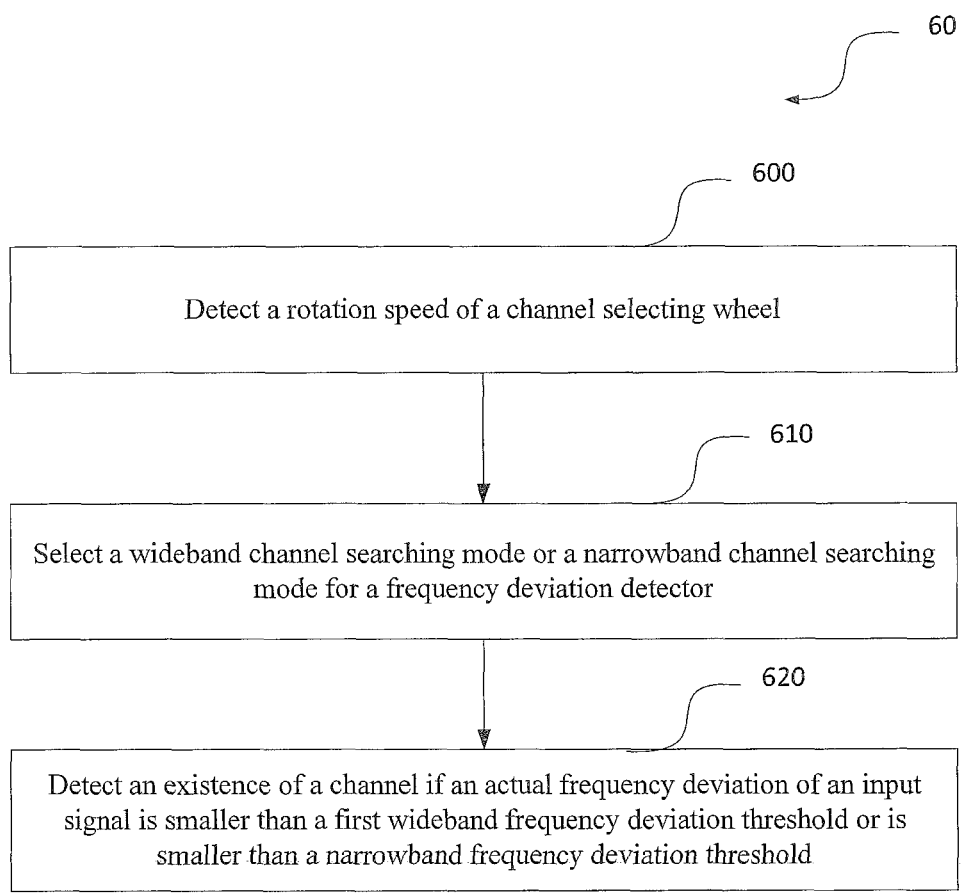
FIG. 6 is a flow chart illustrating an embodiment of a method of detecting a channel.

FIG. 6 is a flow chart illustrating an embodiment of a method of detecting a channel. The method 60 of selecting a channel comprises detecting, in block 600, a speed of a channel selecting mechanism; selecting, in block 610, a wideband channel searching mode for a frequency deviation detector if the speed is higher than a speed threshold, or a narrowband channel searching mode if the speed is lower than the speed threshold; and detecting, in block 620, an existence of a channel if an actual frequency deviation of an input signal is lower than a first wideband frequency deviation threshold when the wideband channel searching mode is selected, or detecting an existence of a channel if the actual frequency deviation is lower than the narrowband frequency deviation threshold when the narrowband channel searching mode is selected.

Figure 7:
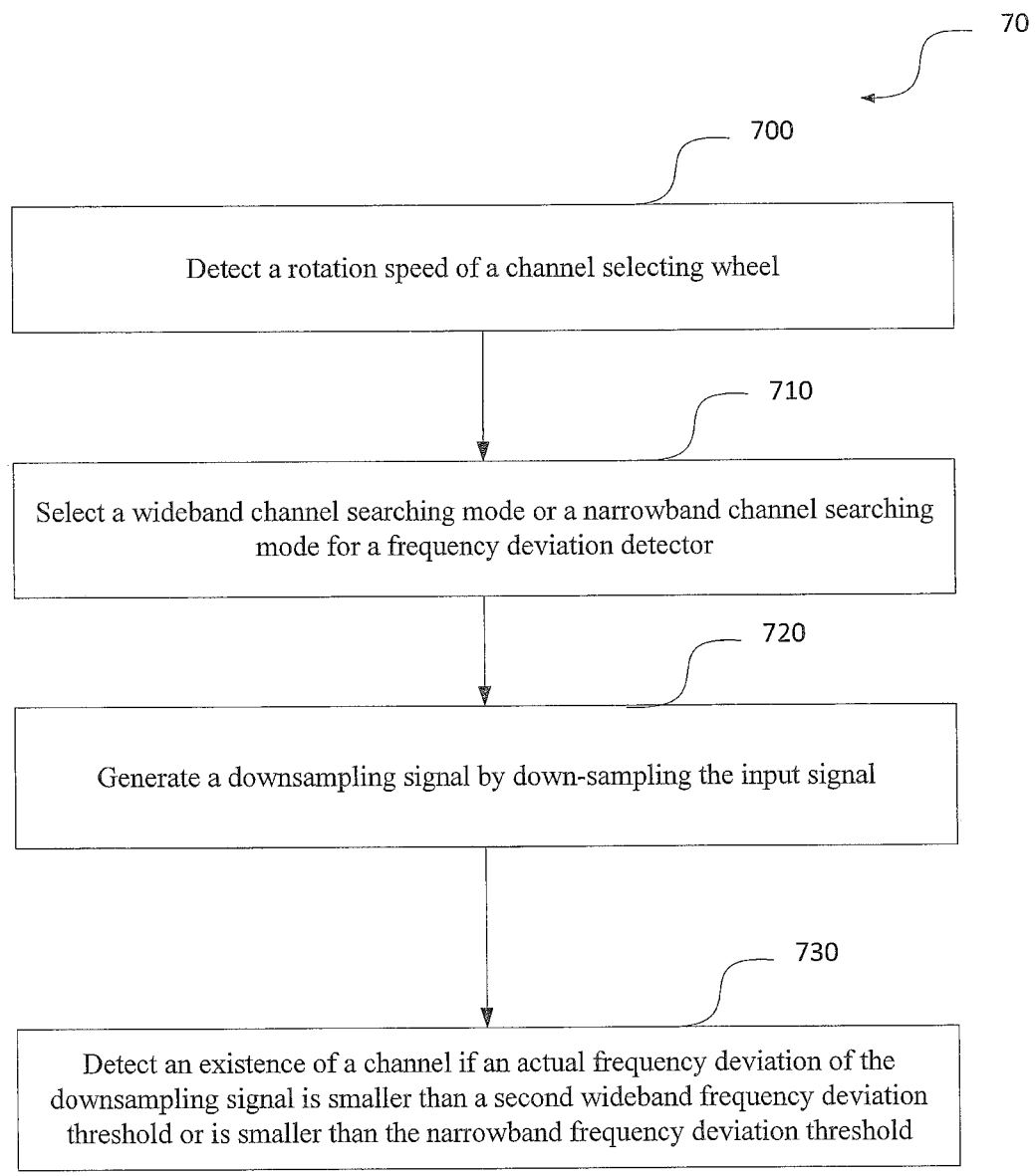
FIG. 7 is a flow chart illustrating another embodiment of a method of detecting a channel.

FIG. 7 is a flow chart illustrating another embodiment of a method of detecting a channel.

Block 700 shown in FIG. 7 is similar to block 600 shown in FIG. 6, and block 710 shown in FIG. 7 is similar to block 610 shown in FIG. 6. Details are omitted for elements similar to those already discussed with reference with FIG. 6.

The method 70 further comprises generating, in block 720, a downsampling signal by down-sampling the input signal; and detecting, in block 730, the existence of the channel further comprises detecting the existence of the channel if the actual frequency deviation of the downsampling signal is lower than a second wideband frequency deviation threshold when the wideband channel searching mode is selected, or detecting the existence of the channel if the actual frequency deviation of the downsampling signal is lower than the narrowband frequency deviation threshold when the narrowband channel searching mode is selected.

Figure 8:
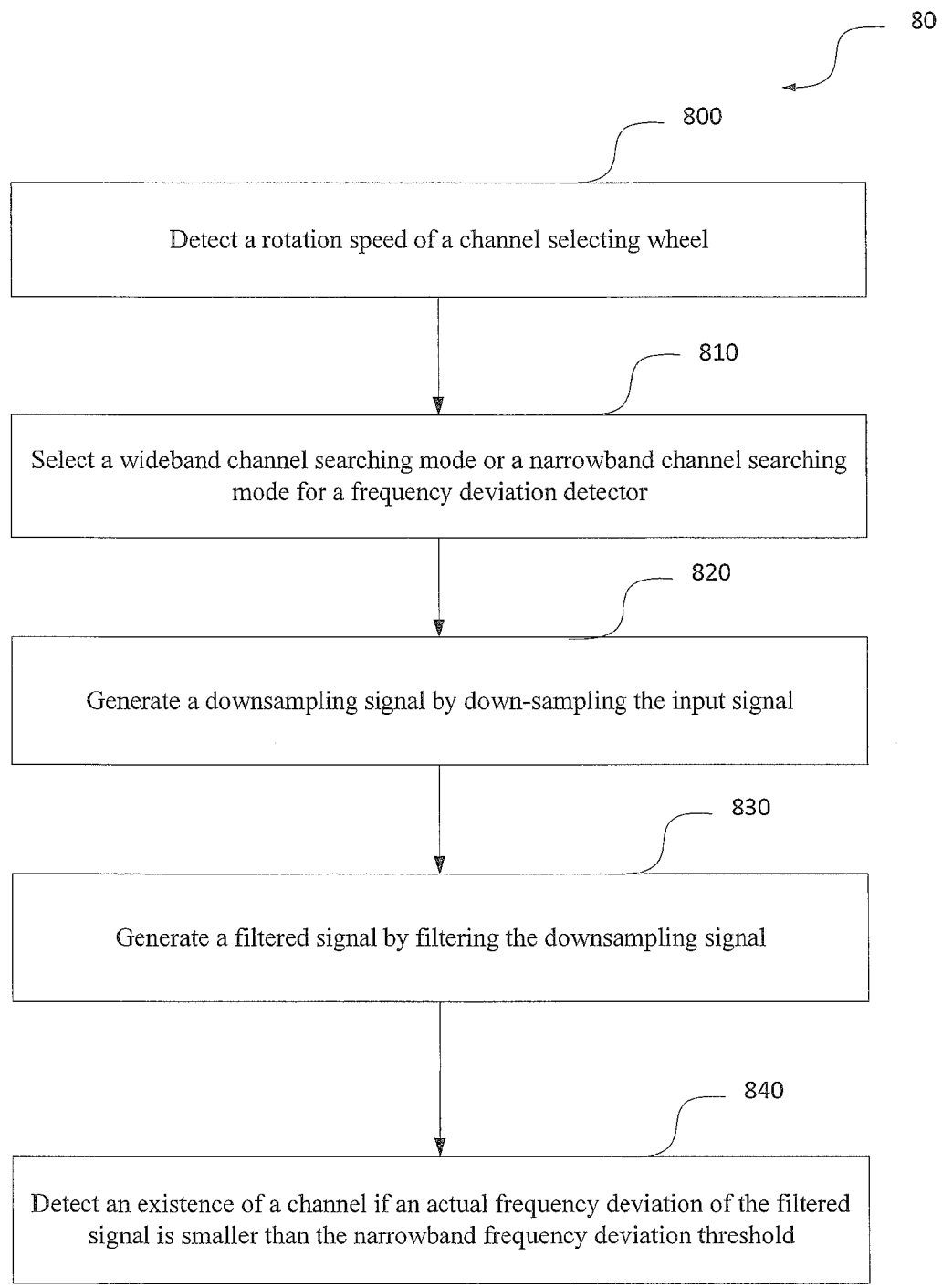
FIG. 8 is a flow chart illustrating another embodiment of a method of detecting a channel.

FIG. 8 is a flow chart illustrating another embodiment of a method of detecting a channel.

Block 800 shown in FIG. 8 is similar to block 700 shown in FIG. 7, block 810 shown in FIG. 8 is similar to block 710 shown in FIG. 7, and block 820 shown in FIG. 8 is similar to block 720 shown in FIG. 7. Details are omitted for elements similar to those already discussed with reference with FIG. 7.

The method 80 further comprises generating, in block 830, a filtered signal by filtering the downsampling signal; and detecting, in block 840, the existence of the channel further comprises detecting the existence of the channel if the actual frequency deviation of the filtered signal is lower than the narrowband frequency deviation threshold when the narrowband channel searching mode is selected.

Figure 9:
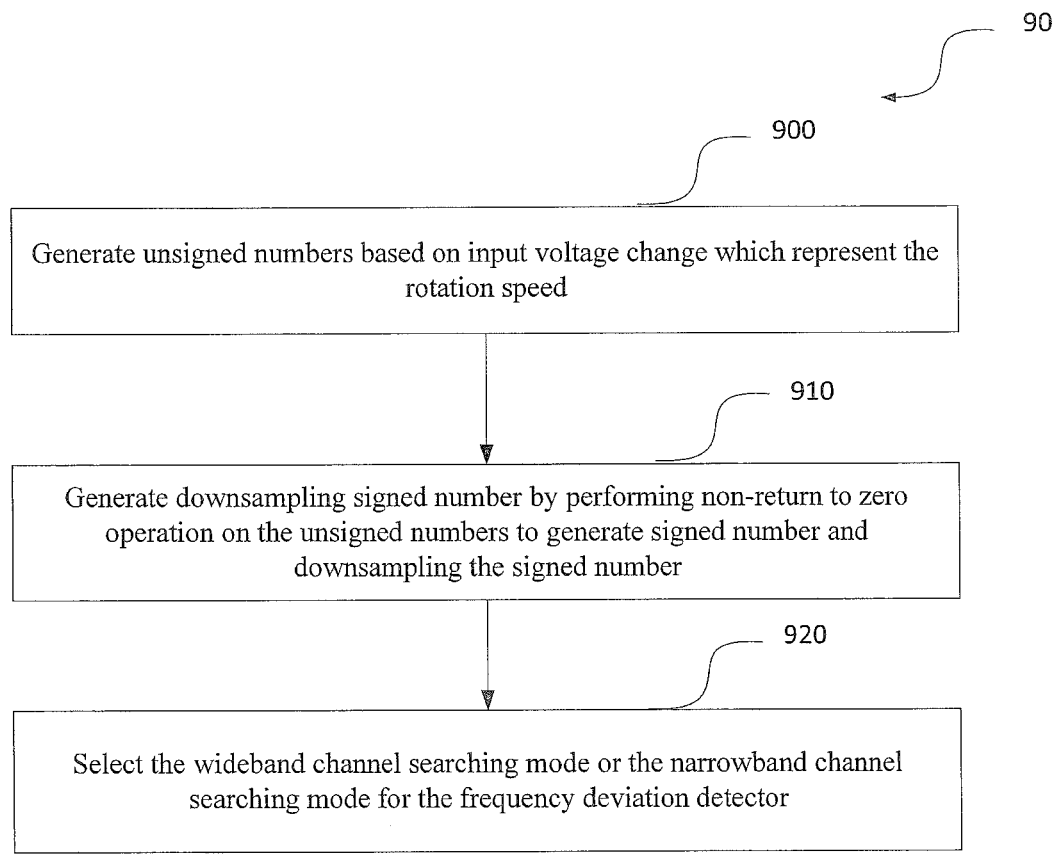
FIG. 9 is a flow chart illustrating an embodiment of a method of detecting speed.

FIG. 9 is a flow chart illustrating an embodiment of a method of detecting speed. The method 90 of detecting a speed of a channel selecting mechanism comprises generating, in block 800, unsigned numbers based on input voltage change which represent the speed; generating, in block 910, downsampling signed number by performing non-return to zero operation on the unsigned numbers to generate signed number and downsampling the signed number; and selecting, in block 920, the wideband channel searching mode for the frequency deviation detector if a frequency difference between a first downsampling signed number and a second downsampling signed number is larger than a first threshold, or select the narrowband channel searching mode for the frequency deviation detector if the frequency difference is lower than or equals the first threshold, wherein there is a fixed time discrepancy between the first downsampling signed number and the second downsampling signed number, and both the first downsampling signed number and the second downsampling signed number are stable.

Figure 10:
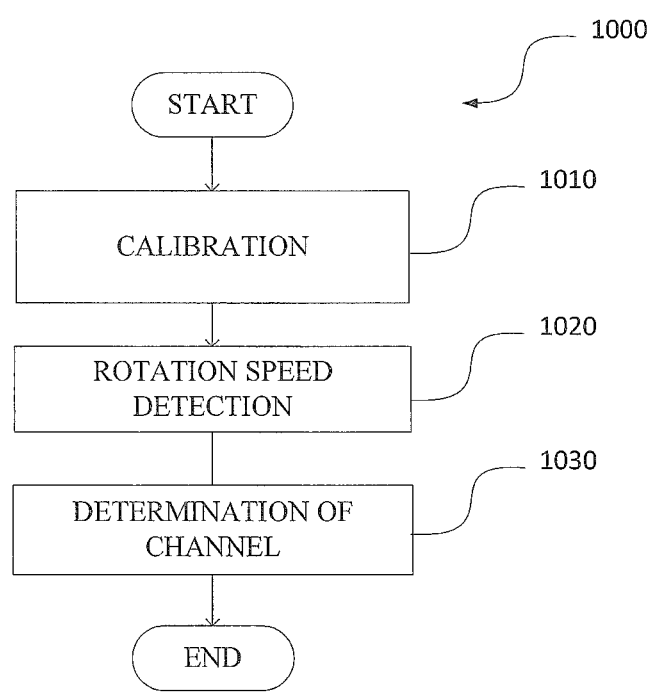
FIG. 10 is a flow chart illustrating an embodiment of a method of detecting a channel.

FIG. 10 is a flow chart illustrating an embodiment of a method 1000 of detecting a channel. The method 1000 comprises calibration in block 1010, speed detection 1020, and determination in block 1030 channel. Each of blocks 1010, 1020, and 1030 will be discussed in further detail with respect to FIGS. 11, 12 and 13 respectively.

Figure 11:
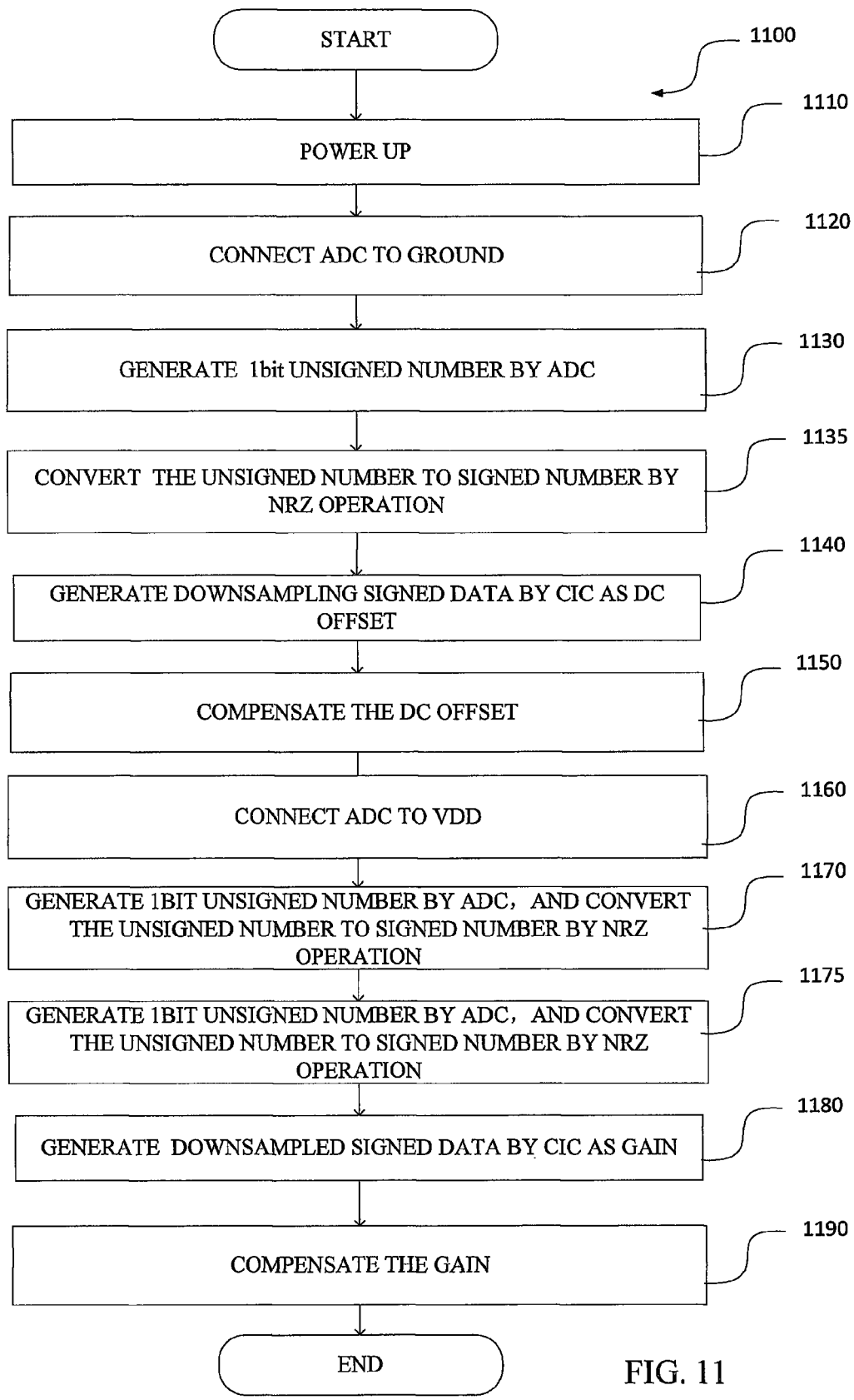
FIG. 11 is a flow chart illustrating an embodiment of a method of calibration.

FIG. 11 is a flow chart illustrating an embodiment of a method 1100 of calibration. The calibration method 1100 is used to calibrate the direct current and gain of the ADC and CIC filter. The method 1100 comprises powering up in block 1110, connecting ADC to ground in block 1120. A 1-bit unsigned number is generated by ADC in block 1130. The clock sample rate may be 31.25 kHz. The ADC outputs 1 to correspond to a positive voltage, and outputs 0 to correspond to a negative voltage. The method 1100 further converts, in block 1135, the unsigned number to signed number by NRZ operation. Then the method 1100 generates, in block 1140, downsampling signed data by Cascaded Integrator-Comb (CIC) filter. The CIC is also called a CIC block, which performs a sample rate decrease (for example, one-tenth) on an input signal by an integer factor. CIC filters are a class of linear phase Finite Impulse Response (FIR) filters comprised of a comb part and an integrator part. The down-sample rate of the CIC filter is 127:1. The transfer function of a CIC filter according to an embodiment may be represented as $$\frac{\left(1-\frac{1}{Z}\right)^3}{1-\frac{1}{Z}} = \left(1-\frac{1}{Z}\right)^2$$

The CIC filter generates a 22-bit binary signed number by increasing the bit width of the 1-bit signed number outputted after the NRZ operation by 21 bits. The CIC output are divided by 128, so that the 22-bit signed number are reduced to 15 bits. The 15-bit signed number is viewed as a DC offset. The method 1100 further comprises compensating the DC offset in block 1150, for example, by subtracting the DC offset from a current value. The method 1100 further comprises connecting ADC to VDD in block 1160. Blocks 1170, 1175 and 1180 are respectively similar to blocks 1130, 1135 and 1140. The method further comprises compensating the gain, in block 1190, for example, by dividing a current value by the gain.

Figure 12:
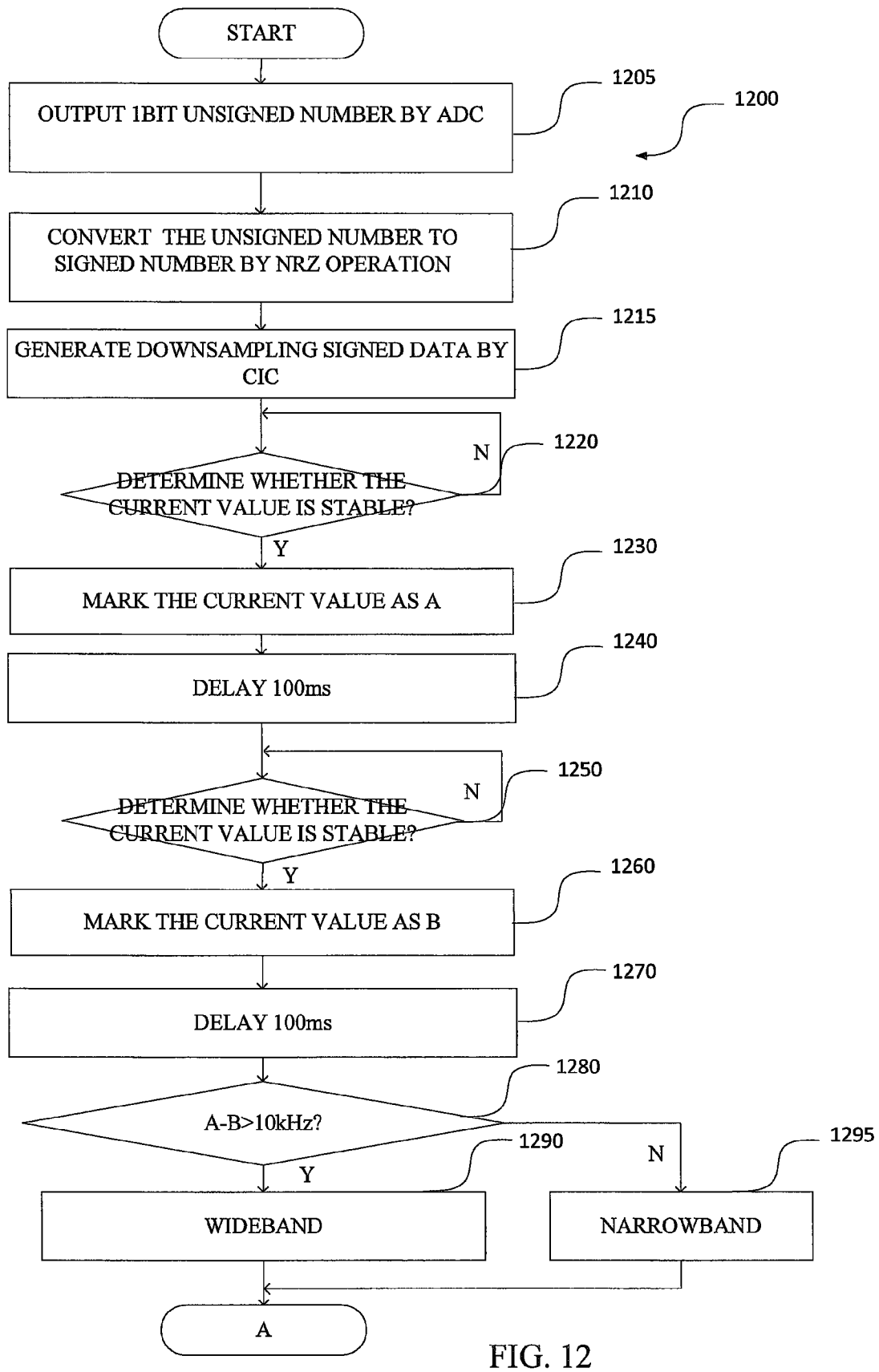
FIG. 12 is a flow chart illustrating an embodiment of a method of detecting speed.

FIG. 12 is a flow chart illustrating a detailed embodiment of a method 1200 of detecting speed. A signal is generated by a user rotating or turning a channel selecting mechanism on the radio. The channel selecting mechanism is also called a tuning mechanism, or tuning wheel. When the user rotates the channel selecting mechanism on the radio, the circuit in the radio will output a voltage as a function of the position of the mechanism. For example, the mechanism may be a rheostat (or variable resistor), therefore different location of a wiper of the rheostat represents different resistance and consequently different voltage. Then the method 1200 outputs, in block 1205, 1-bit unsigned number by the ADC. The clock sample rate may be 31.25 kHz. The ADC outputs 1 to correspond to a positive voltage, and outputs 0 to correspond to a negative voltage. The method 1200 further converts, in block 1210, the unsigned number to signed number by NRZ operation. Then the method 1200 generates, in block 1215, downsampling signed data by Cascaded Integrator-Comb (CIC) filter. The CIC is also called a CIC decimation block, which performs a sample rate decrease (decimation) on an input signal by an integer factor. CIC filters are a class of linear phase Finite Impulse Response (FIR) filters comprised of a comb part and an integrator part. The down-sample rate of the CIC filter is 127:1. The transfer function of a CIC filter according to an embodiment may be represents as $$\left(1-\frac{1}{z}\right)^2$$

The CIC module generates a 22-bit binary signed number by increasing the bit width of the 1-bit signed number outputted after the NRZ operation by 21 bits. The CIC output are divided by 128, so that the 22-bit signed number are reduced to 15 bits. Then a determination unit 430 shown in FIG. 4 determines, in block 1220, whether the current value is stable. If a maximize difference among the current 15-bit signed number and its previous two 15-bit signed numbers is smaller than a second threshold, for example, 2, or in other words, a difference between the largest and smallest number among the three numbers is smaller than a second threshold, then the current 15-bit signed number is determined as stable. Then the method 1200 marks, in block 1230, the current stable number as A. Then the method 1200 delays, in block 1240, for 100 ms. Similar to block 1220, in block 1250, the method 1200 determines whether the current value is stable. If a maximum difference among the current 15-bit signed number and its previous two 15-bit signed numbers is smaller than a second threshold, for example, 2, or in other words, a difference between the largest and smallest number among the three numbers is smaller than a second threshold, then the current 15-bit signed number is determined as stable. Then the method 1200 marks, in block 1260, the current stable number as B. Then the method 1200 delays, in block 1270, for 100 ms. Then the method 1200 determines, in block 1280, whether a difference of a frequency corresponding to number A and a frequency corresponding to number B, which may be represented as A-B, is larger than SPD_TH. Note SPD_TH is a 15-bit signed number which is converted from (or corresponds to) the threshold value of 10 kHz. For example, the frequency range of MW (Middle wavelength) is about 510-1710 KHz, then 510 KHz corresponds to 0, and 1710 KHz corresponds to 2^14. Then threshold 10 kHz corresponds to SPD_TH=round(10*2^14/(1710-510))=137. If the difference is larger than SPD_TH, then the method 1200 determines, in block 1290, that the wideband frequency deviation threshold is selected, or in other words, a wideband channel searching mode is selected, otherwise, the method 1200 determines, in block 1295, that a narrowband frequency deviation threshold is selected, or in other words, a narrowband channel searching mode is selected.

In the above embodiment, a bandwidth of 10 kHz is set as a threshold for comparing with the difference between A and B. The difference between A and B represents the frequency of the changes caused by the user rotating channels in each waveband.

Figure 13:
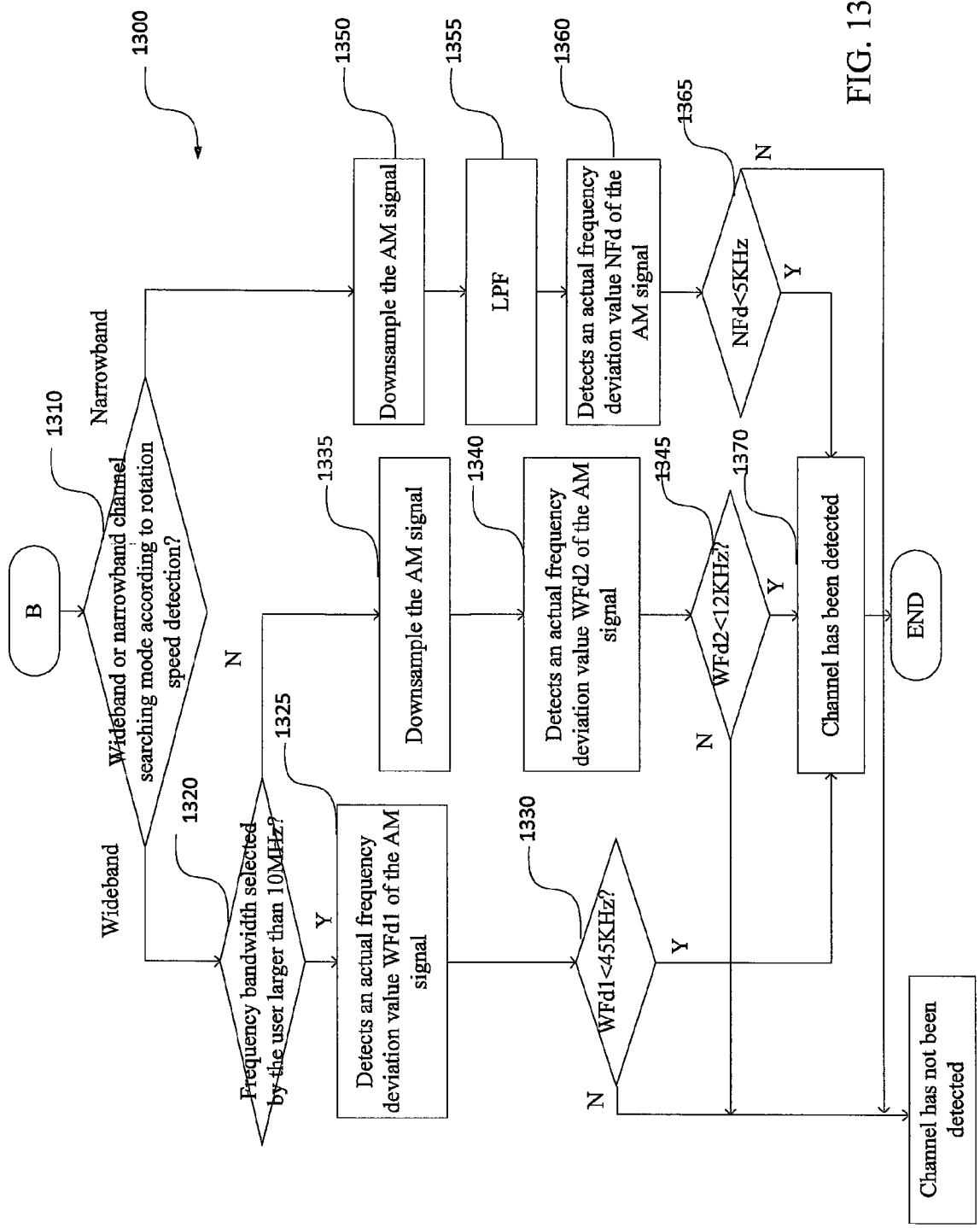
FIG. 13 is a flow chart illustrating another embodiment of a method of detecting a channel.

FIG. 13 is a flow chart illustrating another embodiment of a method of detecting a channel.

Note block A in FIG. 12 may be followed by block B in FIG. 13. The method 1300 comprises determining, in block 1310, whether a wideband or a narrowband channel searching mode is selected according to speed detection result determined in the method 1200 shown in FIG. 12. If wideband channel searching mode is selected, the method 1300 further determines whether Frequency band selected by the user is larger than 10 MHz.

The method 1300 further determines, in block 1320, if a frequency bandwidth selected by the user is larger than 10 MHz. If the frequency bandwidth selected is larger than 10 MHz (SW), the AM signal comprises In-phase branch (I) and a Quadrature branch (Q) which have a middle frequency of 0 Hz, a sample rate of 125 kHz, and a bit-width of 14 bits amplitude modulated digital signals. The method 1300 further detects, in block 1325, an actual frequency deviation value WFd1 of the AM signal. The block 1325 may be implemented by feeding the 14-bit AM signal into a frequency deviation detector 510 shown in FIG. 5 using a first wideband frequency detection threshold ThwFd1. Since the sample rate of the AM signal is 125 kHz, the frequency deviation detector 510 can detects a frequency deviation of 62.5 kHz at most. Then the method 1300 continues to determine whether the actual frequency deviation value WFd1 is lower than a first wideband frequency deviation threshold ThwFd1 of 45 kHz in block 1330. If the actual frequency deviation value WFd1 is lower than the first wideband frequency deviation threshold ThwFd1 of 45 kHz, the method 1300 determines that the channel has been detected. If the actual frequency deviation value WFd1 is higher than the first wideband frequency deviation threshold ThwFd1 of 45 kHz, the method 1300 determines that the channel has not been detected.

Note AM can usually be divided into Middle Waveband (MW) and Short Waveband (SW). If user selects SW1, then the frequency range is smaller than 10 MHz. If user selects SW11, then the frequency range is larger than 10 MHz. The following table is the frequency ranges for each of SW1 to SW11.

| Waveband 7 | SW1 | 3.55-4.63 MHz |
| Waveband 8 | SW2 | 4.27-5.73 MHz |
| Waveband 9 | SW3 | 5.36-6.37 MHz |
| Waveband 10 | SW4 | 6.37-7.70 MHz |
| Waveband 11 | SW5 | 9.26-10.77 MHz |
| Waveband 12 | SW6 | 10.29-12.14 MHz |
| Waveband 13 | SW7 | 12.63-14.48 MHz |
| Waveband 14 | SW8 | 14.62-16.38 MHz |
| Waveband 15 | SW9 | 16.98-18.79 MHz |
| Waveband 16 | SW10 | 20.19-22.15 MHz |
| Waveband 17 | SW11 | 5.99-18 MHz |
| Waveband 18 | SW12 | 7.99-18 MHz |

If the frequency bandwidth selected is smaller than 10 MHz (MW and SW with a bandwidth smaller than 10 MHz), the AM signal comprises In-phase branch (I) and a Quadrature branch (Q) which have a middle frequency of 0 Hz, a sample rate of 125 kHz, and a bit-width of 14 bits amplitude modulated digital signals. The method 1300 further downsamples, in block 1335, the AM signal using the Downsampling unit 530 shown in FIG. 5. The downsampling AM signal has In-phase branch (I) and a Quadrature branch (Q) having a middle frequency of 0 Hz, a sample rate of 31.25 kHz, and a bit-width of 14 bits amplitude modulated digital signals. The method 1300 detects, in block 1340, an actual frequency deviation value WFd2 of the downsampling AM signal. The block 1340 may be implemented by feeding the 14-bit AM signal into a frequency deviation detector 510 shown in FIG. 5 using a second wideband frequency detection threshold ThwFd2. Since the sample rate is 31.25 kHz, the frequency deviation detector 510 can detects a frequency deviation of 15.625 kHz at most. Then the method 1300 continues to determine whether the actual frequency deviation value WFd2 is lower than a second wideband frequency deviation threshold ThwFd2 of 12 kHz in block 1340. If the actual frequency deviation value WFd2 is lower than the second wideband frequency deviation threshold ThwFd2 of 12 kHz, the method 1300 determines that the channel has been detected. If the actual frequency deviation value WFd2 is higher than the second wideband frequency deviation threshold ThwFd2 of 12 kHz, the method 1300 determines that the channel has not been detected.

If in block 1310, a narrowband channel searching mode is selected, the AM signal comprises In-phase branch (I) and a Quadrature branch (Q) which have a middle frequency of 0 Hz, a sample rate of 125 kHz, and a bit-width of 14 bits amplitude modulated digital signals. The method 1300 further downsamples in block 1350, the AM signal using the Down-sampling unit 530 shown in FIG. 5. The downsampling AM signal comprise an In-phase branch (I) and a Quadrature branch (Q) having a middle frequency of 0 Hz, a sample rate of 31.25 kHz, and a bit-width of 14 bits amplitude modulated digital signals. The method 1300 then filters the downsampling AM signal with a low pass filter (LPF) 540 shown in FIG. 5. The low pass filter may have an attenuation of 3 dB and a pass band of 4 kHz. In other words, the attenuation of 3 dB has a frequency of 4 kHz. The low pass filter may remove inference outside the band. The method 1300 then detects, in block 1360, an actual frequency deviation value NFd of the filtered I and Q branches of the AM signal. The block 1360 may be implemented by feeding the 14-bit AM signal into a frequency deviation detector 510 shown in FIG. 5 using a narrowband frequency detection threshold ThnFd. Since the sample rate is 31.25 kHz, the frequency deviation detector 510 can detects a frequency deviation of 15.625 kHz at most. Then the method 1300 continues to determine whether the actual frequency deviation value NFd is lower than a narrowband frequency deviation threshold ThnFd of 5 kHz in block 1365. If the actual frequency deviation value NFd is lower than the narrowband frequency deviation threshold ThnFd of 5 kHz, the method 1300 determines that the channel has been detected. If the actual frequency deviation value NFd is higher than a narrowband frequency deviation threshold ThnFd of 5 kHz, the method 1300 determines that the channel has not been detected.

With at least one embodiment of the invention, the circuit may automatically follow the speed of the channel selecting mechanism for detecting channels. The circuit can search channels accurately without missing channels. The channel searching experience may be improved.

It should be appreciated by those skilled in the art that components from different embodiments may be combined to yield another technical solution. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device for selecting a channel, comprising:
   a speed detector configured to detect a speed of a channel selecting mechanism;
   a controller connected to the speed detector; and
   a frequency deviation detector connected to the controller and configured to receive an input signal,
   wherein the controller is configured to select a wideband channel searching mode for the frequency deviation detector if the speed is higher than a speed threshold, or a narrowband channel searching mode if the speed is lower than the speed threshold;
   the frequency deviation detector is configured to detect an existence of a channel if an actual frequency deviation of the input signal is lower than a first wideband frequency deviation threshold when the wideband channel searching mode is selected, or detect the existence of a channel if the actual frequency deviation is lower than a narrowband frequency deviation threshold when the narrowband channel searching mode is selected.

2. The device of claim 1, further comprising a down-sampling unit coupled to both the controller and the frequency deviation detector, and configured to generate a downsampling signal by down-sampling the input signal; and
   the frequency deviation detector is configured to detect the existence of the channel if the actual frequency deviation of the downsampling signal is lower than a second wideband frequency deviation threshold when the wideband channel searching mode is selected, or detect the existence of the channel if the actual frequency deviation of the downsampling signal is lower than the narrowband frequency deviation threshold when the narrowband channel searching mode is selected.

3. The device of claim 2, further comprising a low pass filter coupled to both the downsampling unit and the frequency deviation detector and configured to generate a filtered signal by filtering the downsampling signal; and
   the frequency deviation detector is further configured to detect the existence of the channel if the actual frequency deviation of the filtered input signal is lower than the narrowband frequency deviation threshold when the narrowband channel searching mode is selected.

4. The device of claim 1, wherein the speed detector further comprises an analog-to-digital converter, a cascaded integrator-comb filter, and a determination unit, wherein
   the analog-to-digital converter is configured to generate unsigned numbers based on input voltage change which represent the speed;
   the cascaded integrator-comb filter is connected to the analog-to-digital converter and configured to generate downsampling signed number by performing non-return to zero operation on the unsigned numbers to generate signed number and downsampling the signed number;
   the determination unit is connected to the cascaded integrator-comb filter and configured to select the wideband frequency deviation threshold for the frequency deviation detector if a frequency difference between a first downsampling signed number and a second downsampling signed number is higher than a first threshold, or select the narrowband frequency deviation threshold for the frequency deviation detector if the frequency difference is lower than or equals the first threshold, wherein there is a fixed time discrepancy between the first downsampling signed number and the second downsampling signed number, and both the first downsampling signed number and the second downsampling signed number are stable.

5. The device of claim 4, wherein the determination unit is configured to determine that the first downsampling signed number is stable if a maximize difference among the first downsampling signed number and its previous two downsampling signed numbers is smaller than a second threshold.

6. The device of claim 4, further comprising a compensator and a state machine unit, wherein state machine unit is connected to both the analog-to-digital converter and the determination unit and configured to obtain a DC offset voltage of the analog-to-digital converter by connecting the analog-to-digital converter to ground, and the compensator is configured to compensate for the DC offset voltage.

7. The device of claim 6, wherein the state machine unit is further configured to obtain a gain of the analog-to-digital converter by connecting the analog-to-digital converter to power source of the analog-to-digital converter after the DC offset voltage is compensated for; and the compensator is configured to compensate for the gain.

8. The device of claim 1, wherein the channel selecting mechanism comprises a channel selecting wheel.

9. A method of selecting a channel, comprising:

detecting a speed of a channel selecting mechanism;

selecting a wideband channel searching mode for a frequency deviation detector if the speed is higher than a speed threshold, or a narrowband channel searching mode if the speed is lower than the speed threshold;

detecting an existence of a channel if an actual frequency deviation of an input signal is lower than a first wideband frequency deviation threshold when the wideband channel searching mode is selected, or detecting an existence of a channel if the actual frequency deviation is lower than a narrowband frequency deviation threshold when the narrowband channel searching mode is selected.

10. The method of claim 9, further comprising:

generating a downsampling signal by down-sampling the input signal; and detecting the existence of the channel further comprises detecting the existence of the channel if the actual frequency deviation of the downsampling signal is lower than a second wideband frequency deviation threshold when the wideband channel searching mode is selected, or detecting the existence of the channel if the actual frequency deviation of the downsampling signal is lower than the narrowband frequency deviation threshold when the narrowband channel searching mode is selected.

11. The method of claim 10, further comprising:

generating a filtered signal by filtering the downsampling signal; and detecting the existence of the channel further comprises detecting the existence of the channel if the actual frequency deviation of the filtered signal is lower than the narrowband frequency deviation threshold when the narrowband channel searching mode is selected.

12. The method of claim 9, wherein detecting a speed of a channel selecting mechanism further comprises:

generating unsigned numbers based on input voltage change which represent the speed;

generating downsampling signed number by performing non-return to zero operation on the unsigned numbers to generate signed number and downsampling the signed number;

selecting the wideband frequency deviation threshold for the frequency deviation detector if a frequency difference between a first downsampling signed number and a second downsampling signed number is larger than a first threshold, or select the narrowband frequency deviation threshold for the frequency deviation detector if the frequency difference is lower than or equals the first threshold, wherein there is a fixed time discrepancy between the first downsampling signed number and the second downsampling signed number, and both the first downsampling signed number and the second downsampling signed number are stable.

13. The method of claim 12, wherein determining that the first downsampling signed number is stable if a maximize difference among the first downsampling signed number and its previous two downsampling signed numbers is smaller than a second threshold.

14. The method of claim 12 further comprising obtaining a DC offset voltage of the analog-to-digital converter by connecting the analog-to-digital converter to ground, and compensating for the DC offset voltage.

15. The method of claim 14, obtaining a gain of the analog-to-digital converter by connecting the analog-to-digital converter to power source of the analog-to-digital converter after the DC offset voltage is compensated for; and compensating for the gain.

16. The method of claim 9, wherein the channel selecting mechanism comprises a channel selecting wheel.

* * * * *